US012562022B2

(12) United States Patent
Monteverdi

(10) Patent No.: US 12,562,022 B2
(45) Date of Patent: Feb. 24, 2026

(54) SEARCH AND SELECTION OF SPORTS BETTING OPTIONS USING NATURAL LANGUAGE UNDERSTANDING

(71) Applicant: SGN Advisors LLC, Hillsborough, CA (US)

(72) Inventor: Matteo Monteverdi, Hillsborough, CA (US)

(73) Assignee: SGN Advisors LLC, Hillsborough, CA (US)

( * ) Notice: Subject to any disclaimer, the term of this patent is extended or adjusted under 35 U.S.C. 154(b) by 322 days.

(21) Appl. No.: 18/210,256

(22) Filed: Jun. 15, 2023

(65) Prior Publication Data

US 2023/0410591 A1     Dec. 21, 2023

Related U.S. Application Data

(60) Provisional application No. 63/353,220, filed on Jun. 17, 2022.

(51) Int. Cl.
G07F 17/32 (2006.01)
G10L 15/18 (2013.01)

(52) U.S. Cl.
CPC ...... G07F 17/3209 (2013.01); G07F 17/3211 (2013.01); G07F 17/3223 (2013.01); G07F 17/3288 (2013.01); G10L 15/18 (2013.01); G07F 17/323 (2013.01)

(58) Field of Classification Search
CPC ............. G07F 17/3209; G07F 17/3211; G07F 17/3223; G07F 17/3288; G07F 17/323; G10L 15/18
See application file for complete search history.

(56) References Cited

U.S. PATENT DOCUMENTS

2002/0178007 A1* 11/2002 Slotznick ................ G10L 13/00
                                                                  704/270.1
2022/0122601 A1*  4/2022 Cronin ................. G06V 40/172

* cited by examiner

*Primary Examiner* — Kevin Y Kim
(74) *Attorney, Agent, or Firm* — Sage Patent Group

(57) ABSTRACT

A method includes receiving, by a microphone of a user device, an audio communication from a user of the user device. The method further includes interpreting, by a processor circuit, the audio communication. The method further includes, based on the interpretation, determining, by the processor circuit, a sporting event prediction. The method further includes correlating, by the processor circuit, the sporting event prediction with a plurality of sports bets. The method further includes providing an indication of the plurality of sports bets to the user. The method further includes receiving, by an input device of the user device, a selection of at least one sports bet of the plurality of sports bets. The method further includes, based on the selection, placing the at least one sports bet.

20 Claims, 11 Drawing Sheets

204

204

204

204

204

SEARCH AND SELECTION OF SPORTS BETTING OPTIONS USING NATURAL LANGUAGE UNDERSTANDING

CROSS REFERENCE TO RELATED APPLICATIONS

The present application claims benefit of priority to U.S. Provisional Patent Application No. 63/353,220 filed Jun. 17, 2022, the disclosure and content of which is incorporated by reference herein in its entirety.

BACKGROUND

Online sports betting involves predicting results of sports events and placing wagers on specific outcomes using digital devices, such as smartphones, tablets, smart devices, personal computers, etc. Each sports event may be broken up into a variety of betting markets, which include specific types or categories of betting options on the particular event. Different betting markets may each focus on a specific element of the event, such as the event winner, the final score, the finishing order, etc., which are based on the rules of the event, the participants in the event, and other factors specific to the event. For a single sports event, there may be hundreds of different available betting markets, or more. Accordingly, there is a need to navigate sports betting markets quickly and efficiently.

SUMMARY

According to some embodiments, a method includes receiving, by a microphone of a user device, an audio communication from a user of the user device. The method further includes interpreting, by a processor circuit, the audio communication. The method further includes, based on the interpretation, determining, by the processor circuit, a sporting event prediction. The method further includes correlating, by the processor circuit, the sporting event prediction with a plurality of sports bets. The method further includes providing an indication of the plurality of sports bets to the user. The method further includes receiving, by an input device of the user device, a selection of at least one sports bet of the plurality of sports bets. The method further includes, based on the selection, placing the at least one sports bet.

According to some embodiments, a system includes a processor circuit and a memory coupled to the processor circuit. The memory includes machine-readable instructions that, when executed by the processor circuit, cause the processor circuit to receive, from a microphone of a user device, an audio communication from a user of the user device. The instructions further cause the processor circuit to interpret the audio communication. The instructions further cause the processor circuit to, based on the interpretation, determine a sporting event prediction. The instructions further cause the processor circuit to correlate the sporting event prediction with a plurality of sports bets. The instructions further cause the processor circuit to provide an indication of the plurality of sports bets to the user.

According to some embodiments, a computing device includes a processor circuit and a memory coupled to the processor circuit. The memory includes machine-readable instructions that, when executed by the processor circuit, cause the processor circuit to receive, from a microphone associated with the computing device, an audio communication from a user of the computing device. The instructions further cause the processor circuit to interpret the audio communication using the NLU module. The instructions further cause the processor circuit to, based on the interpretation, determine a sporting event prediction using the AI module. The instructions further cause the processor circuit to transmit the sporting event prediction to a sport bet provider. The instructions further cause the processor circuit to receive a plurality of sports bets from the sport bet provider. The instructions further cause the processor circuit to cause a display device to display an indication of the plurality of sports bets to the user. The instructions further cause the processor circuit to receive, by an input device associated with the computing device, a selection of at least one sports bet of the plurality of sports bets. The instructions further cause the processor circuit to, based on the selection, transmit an instruction to the sports bet provider to place at least one sports bet.

The disclosed embodiments, examples, and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, software and hardware modules, computer-implemented methods, computer readable media, and computer program products associated with the above discussed technical benefits.

DETAILED DESCRIPTION

Embodiments of the disclosure relate to sports betting and in particular to search and selection of sports betting options using Natural Language Understanding (NLU). In some examples, a method may include receiving an audio communication from a user of a user device, e.g., via a microphone of the user device, and interpreting the audio communication using NLU. Based on the interpretation, a sporting event prediction is determined and correlated with a plurality of sports bets. An indication of the plurality of sports bets is provided to the user, a selection of at least one sports bet is received, and the selected sports bet is placed.

Figure 1:
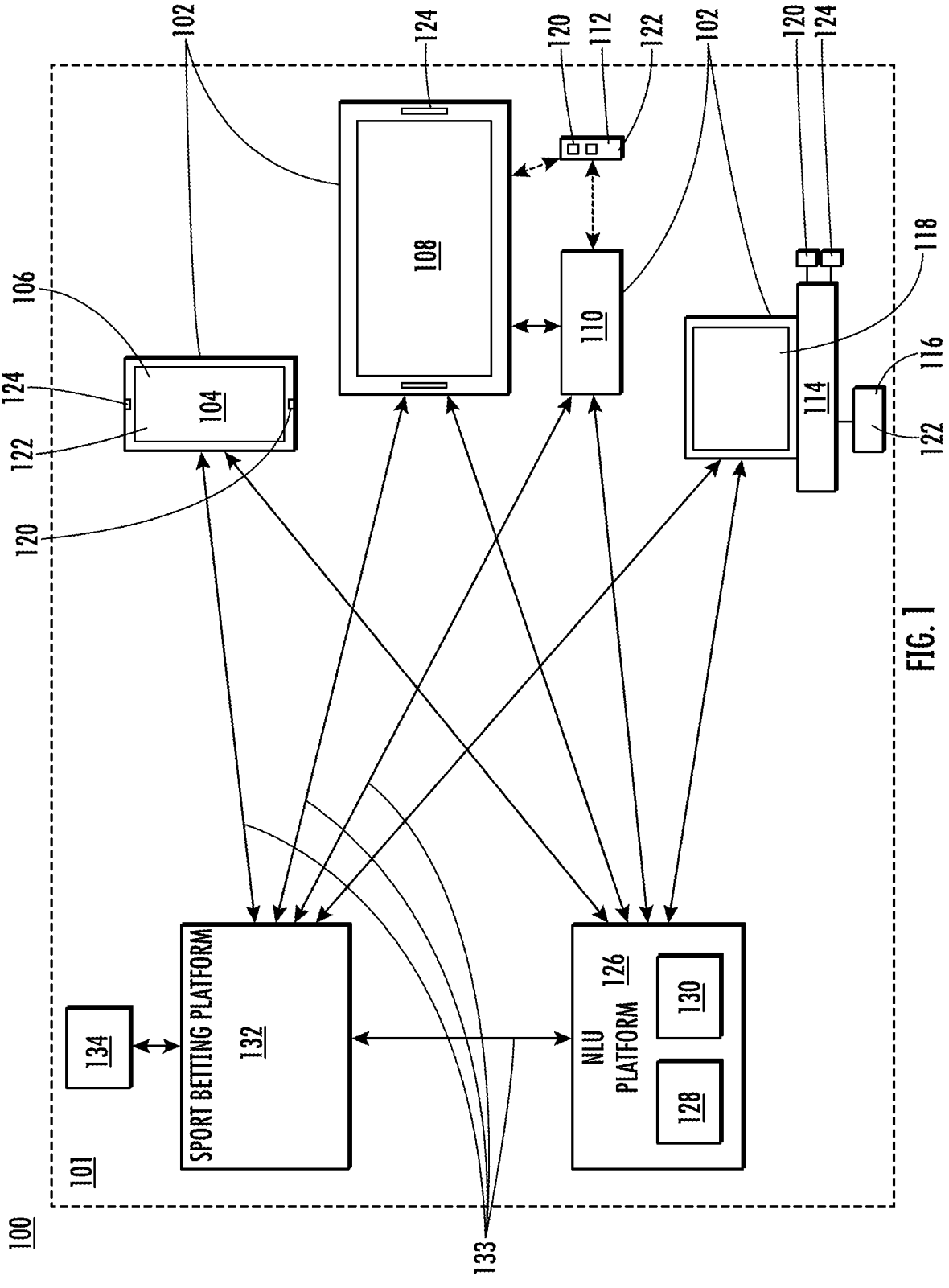
FIG. 1 is a block diagram of an exemplary system for different types of user devices interacting with an NLU platform and a sports betting platform, according to some embodiments.

FIG. 1 illustrates a block diagram of an exemplary system 100 for different types of user devices 102 interacting with an NLU platform 126 and a sports betting platform 132, according to some embodiments. In this example, the user devices may include mobile devices 104, e.g., phones, tablets, wearables, etc., television devices 108, computing devices 114, e.g., personal computers, and other devices that are capable of interacting with online betting platforms. In this example, a mobile device 104, such as a smartphone, may include a touchscreen display 106 for providing touch input and displaying information to a user. The television device 108, such as a smart TV, may include integrated apps and may be controlled using a remote-control device 112. In some examples, the television device 108 may operate as a display, with a set top digital media player 110 running the apps and being controlled by the remote-control device 112. The computing device 114, such as a desktop or laptop personal computer, may include a keyboard 116 and/or other input devices, an integrated or separate display 118, etc., as desired. In this example, the user devices 102 may include microphones 120, input device 122, speakers 124, and/or other components that enable interaction between the user devices 102 and the other components of the system 100.

The NLU platform 126 may include an NLU module, which may be a software and/or hardware computing module, for interpreting audio communications, i.e., speech input, received via the microphone 120 of a respective user device 102. The NLU platform 126 may also include an Artificial Intelligence (AI) module 130, which may be a software and/or hardware computing module, for determining a sporting event prediction based on the interpreted audio communication. The AI module 130 may include a trained or untrained AI and/or machine learning model, such as a neural network, linear and/or logistic regression, native Bayes, K-Nearest Neighbors, etc., for example. The NLU platform 126 may be primarily directed to understanding spoken or written words and phrases, i.e., unstructured data, and converting this unstructured data into structured data in a machine-readable format. In particular, the NLU platform 126 may be specifically trained to understand spontaneous predictions and convert the determined predictions into relevant sports betting options.

In some examples, the AI module may be trained using training data, i.e., "sample utterances," which may be written examples of common phrases used in sports betting and sports discussions. The training data may be organized into categories or "buckets", with each bucket containing different examples of phrases that may have the same or similar meaning. Each bucket may have a specific label corresponding to a sporting event prediction that may be output. In this manner, the NLU platform may recognize the prediction and return one or more possible betting options based on the prediction.

In this example, each result may include an N-Best list data structure that includes recognized text, a determined representation of the nominal betting options, and a confidence score. If the top result or group of results have sufficiently high confidence scores and/or are well-separated from the rest of the N-Best list, the top result(s) may be provided to the user device. If the top result(s) do not have sufficiently high confidence score or are not sufficiently well separated from other possible interpretations and entries on the N-Best list, the N-Best list may be generated and some or all of the N-Best list may be transmitted to the user device for presentation to the user. In some examples, a reduced version of the N-Best list with a minimum threshold confidence score may be returned, and/or some other acceptance criteria may be used.

The sports betting platform 132 may communicate with the NLU platform 126 to receive the determined sporting event prediction and correlate the prediction with a plurality of sports bets by referencing a sports bet database 134. Alternatively, or in addition, the user device(s) 102 may communicate with the NLU platform 126 to receive the determined sporting event prediction and may then communicate directly with the sports betting platform 132 to provide the sporting event prediction and to receive the correlated plurality of sports bets.

The components of the system 100 may be part of a network 101, which may include one or more wired and/or wireless networks. The components may communicate with each other via wired and/or wireless communication links 134, which may employ any number of communication methods and/or protocols, including Ethernet, WiFi, Bluetooth, cellular, NFC, etc.

FIGS. 2A-2E illustrate a graphical user interface (GUI) 236 for a mobile application being displayed on a touch-screen display 206 of a mobile device 204, similar to the mobile device 104 of FIG. 1, for example. In this example, the mobile application represents a front end of a sports betting platform operated by a bookmaker, of which the user of the mobile application is a customer, but it should be understood that many different arrangements and transactional structures may be used.

Figure 2A:
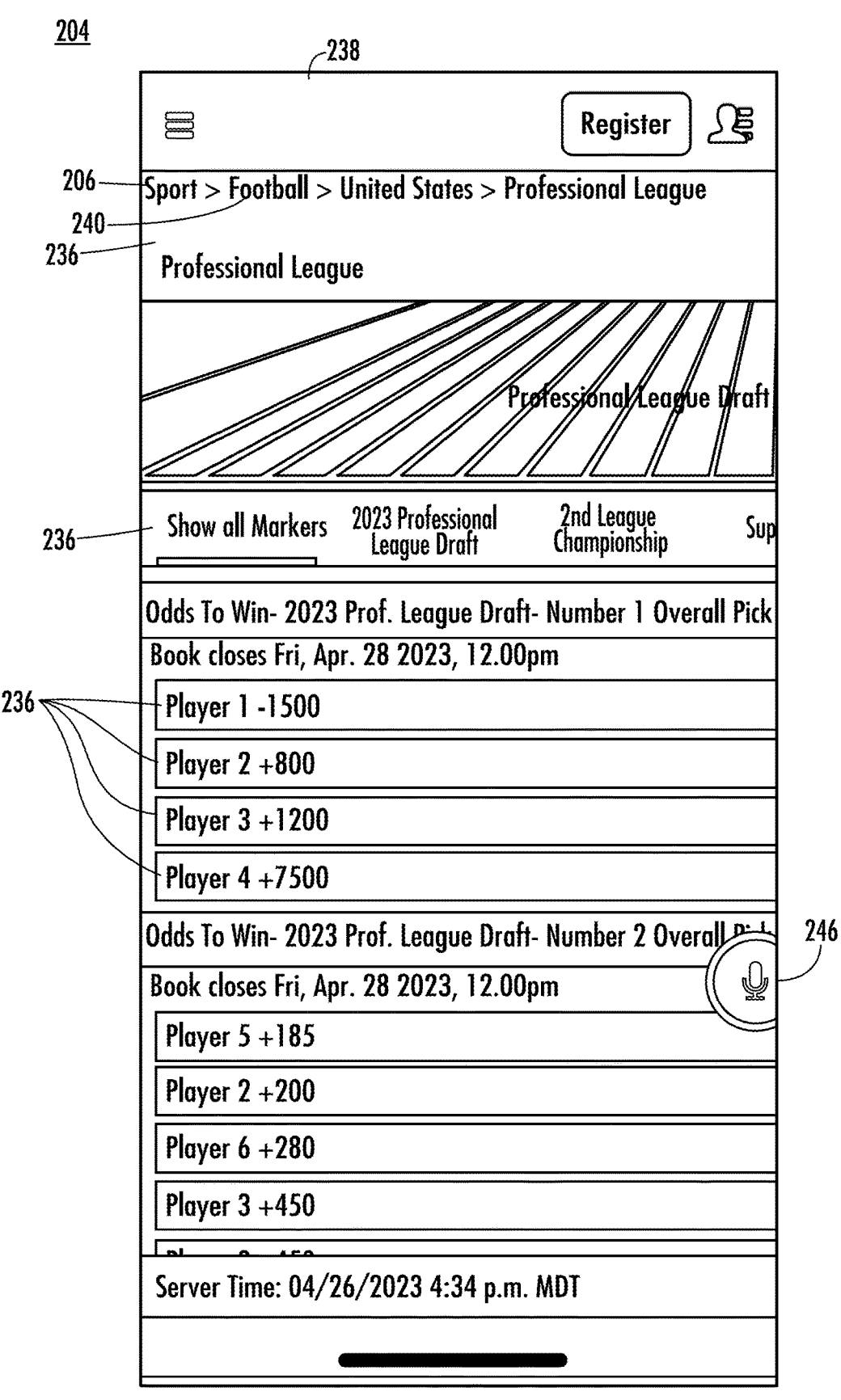
FIGS. 2A-2E illustrate a graphical user interface (GUI) 236 for a mobile application being displayed on a touch-screen display of a mobile device, according to some embodiments.

As shown in FIG. 2A, the GUI 236 may include a navigation bar 238 and a navigation hierarchy 240 for navigating different pages within a hierarchy of bet categories, e.g., by sport, location, league, division, etc. The GUI 236 may also include a market selection area 242 or selecting among different specific markets, e.g., league championships, league drafts, etc.

The GUI 236 may also include a listing of individual bets 244 in a selected betting market and/or group of betting markets. As used herein, a betting market is a specific type or category of bet on a particular event, with every sports event broken up into a variety of betting markets. In some embodiments, each of these markets may focus on a specific element of the event (e.g., the event winner or the final score or the finishing order of the event). In some examples, there might be hundreds of different betting markets on offer for a single sports match.

One drawback of conventional online sports betting apps is that it can be difficult to manually navigate to a specific betting market or locate a specific desired sports bet. For example, many conventional online betting systems involve a multi-step process to place a bet, e.g., (1) finding the sports event/fixture what to bet on, (2) identifying a betting market among multiple betting markets where the player feels confident to predict an accurate outcome, (3) reviewing the options and odds available, (4) selecting the option from the betting market, (5) entering the stake and finally (6) confirming/placing the bet. This problem can be exacerbated by the availability of in-play betting, such as a bet on an upcoming play during the event, with very short timeframes for selection and placement of the bets, and where betting odds may be constantly changing. The resulting user experience may be cumbersome and unwelcoming, which may reduce adoption, game velocity and customer satisfaction.

Figure 2B:
Figure 2C:
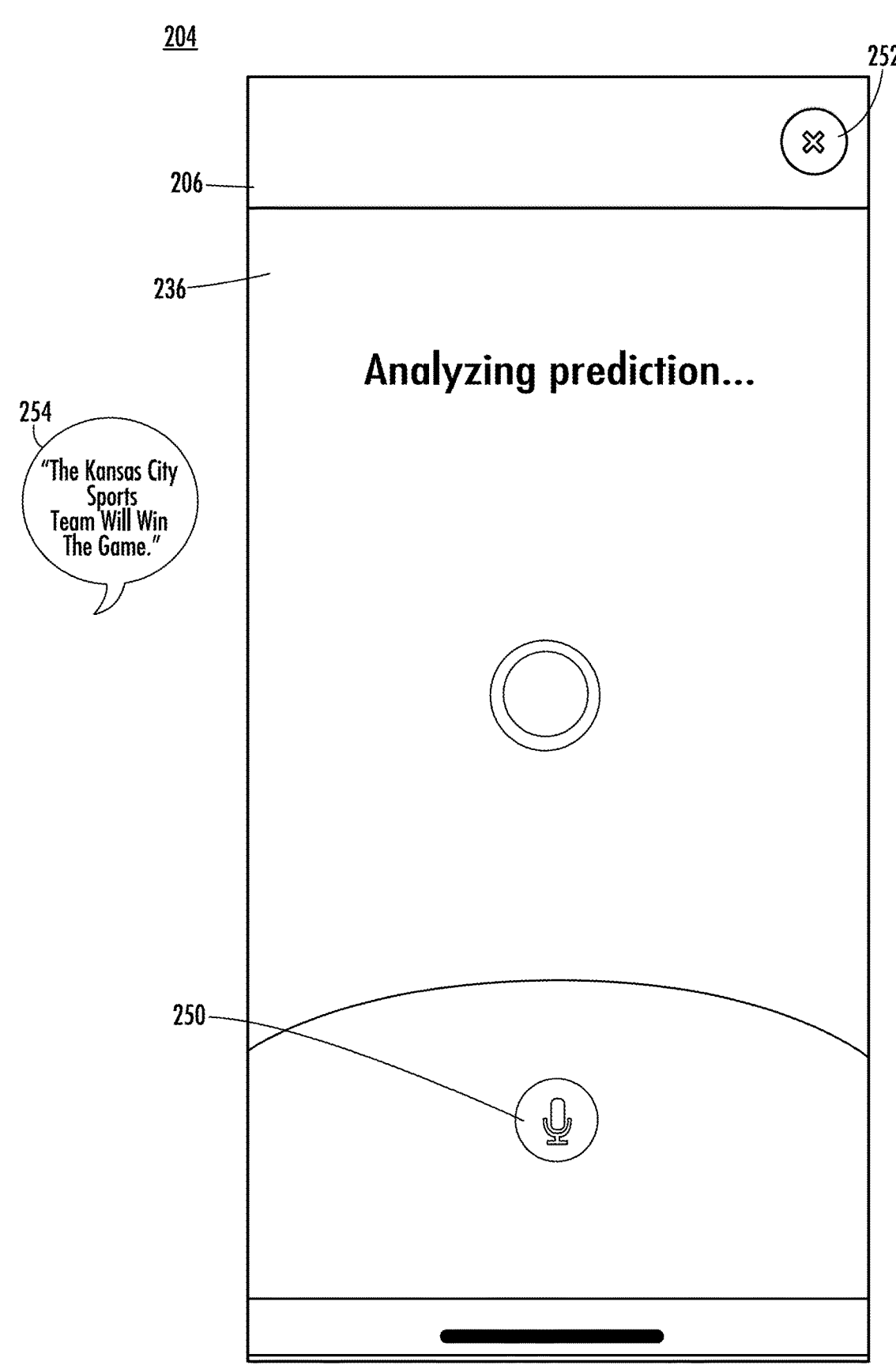

To facilitate faster and more efficient location and selection of sports bets, the GUI 236 may include a voice input button 246. As shown by FIG. 2B, selection of the voice input button 246 causes a prompt 248 to be displayed for providing an audio communication, i.e., voice input, for a sporting event prediction. The GUI 236 may also include a microphone button 250 for activating and/or muting the microphone, and a cancel button 252 for exiting the voice prompt portion of the GUI 236. The audio communication 254 is then digitized and processed and may be transmitted to a NLU platform via a data communication channel. As shown by FIG. 2C, in response to receiving an audio communication 254 via the microphone, the GUI 236 may display an analysis screen while the NLU platform is interpreting the audio communication 254 and determining the sports bet prediction and while the sports betting platform is correlating the sports bet prediction with a plurality of sports bets in its database.

Figure 2D:
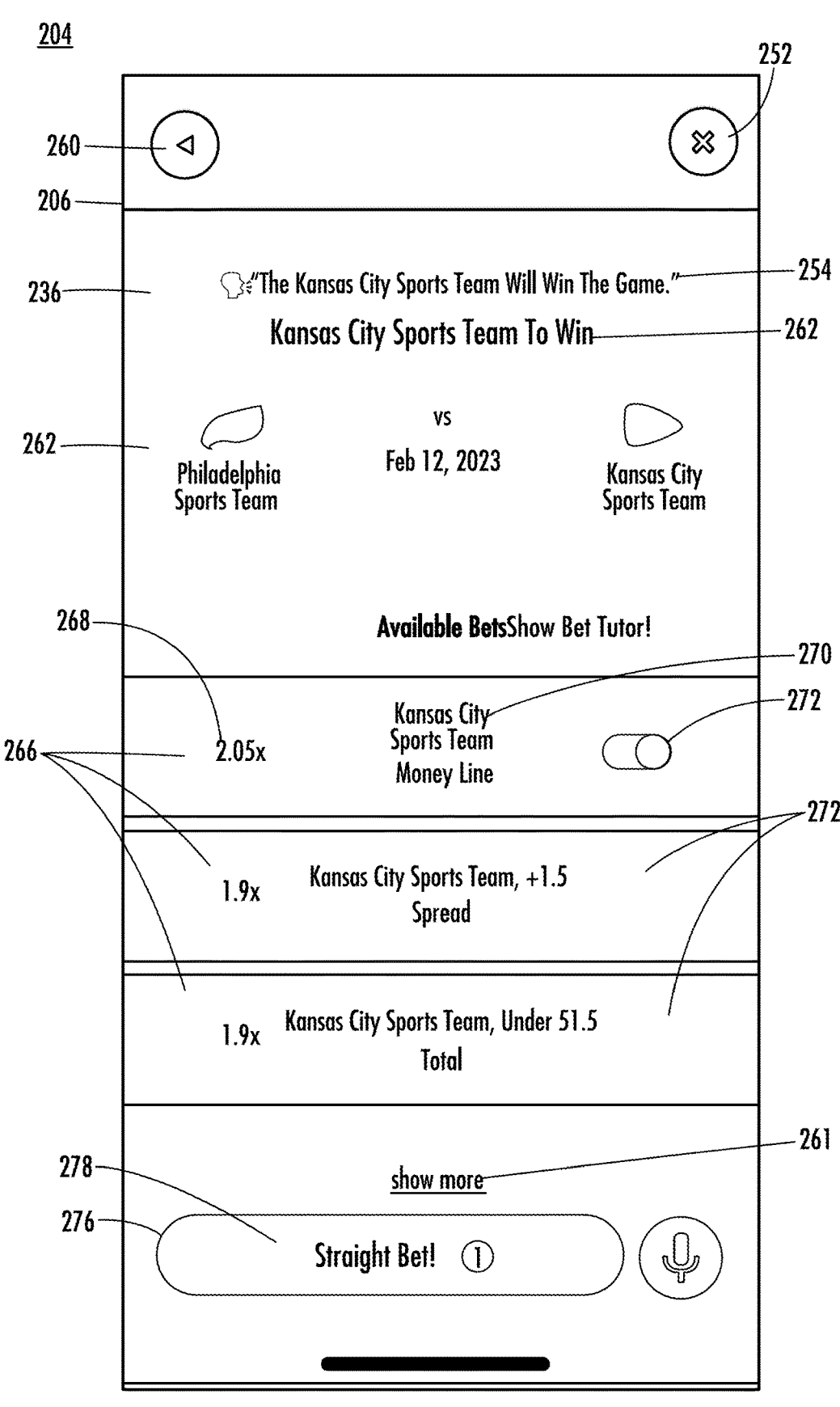

As shown in FIG. 2D, a bet selection screen 258 next displays the determined sports bet prediction 262 ("The Kansas City sports team will win the game") and an associated sporting event 264 (Philadelphia sports team vs. Kansas City sports team on a specified date), along with the correlated plurality of sports bets 266. In some examples, the GUI 236 may also, or alternatively, display the interpreted audio communication 254. This may allow the user to compare the accuracy of both the interpretation of the determination of the sports bet prediction and may modify future queries and/or provide feedback to the NLU platform to improve the accuracy of future operations.

Each sports bet 266 may include associated odds 268, bet details 270, e.g., teams, bet type, spread, etc., and a selection indicator 272 for the player to select or deselect the sports bet 266. The GUI 236 may also include a back button 260 for returning to a previous screen and a "show more" button 261 for displaying additional sports bets 266 from the correlated plurality of sports bets 266. After one or more bets are selected, the user may press a bet placement button 276 to place the bets with the sports betting platform. In this example, based on selection of one of the sports bets 266, the bet placement button 276 may display a "straight bet" indicator 278 to indicate that a single standalone bet is being placed.

Figure 2E:
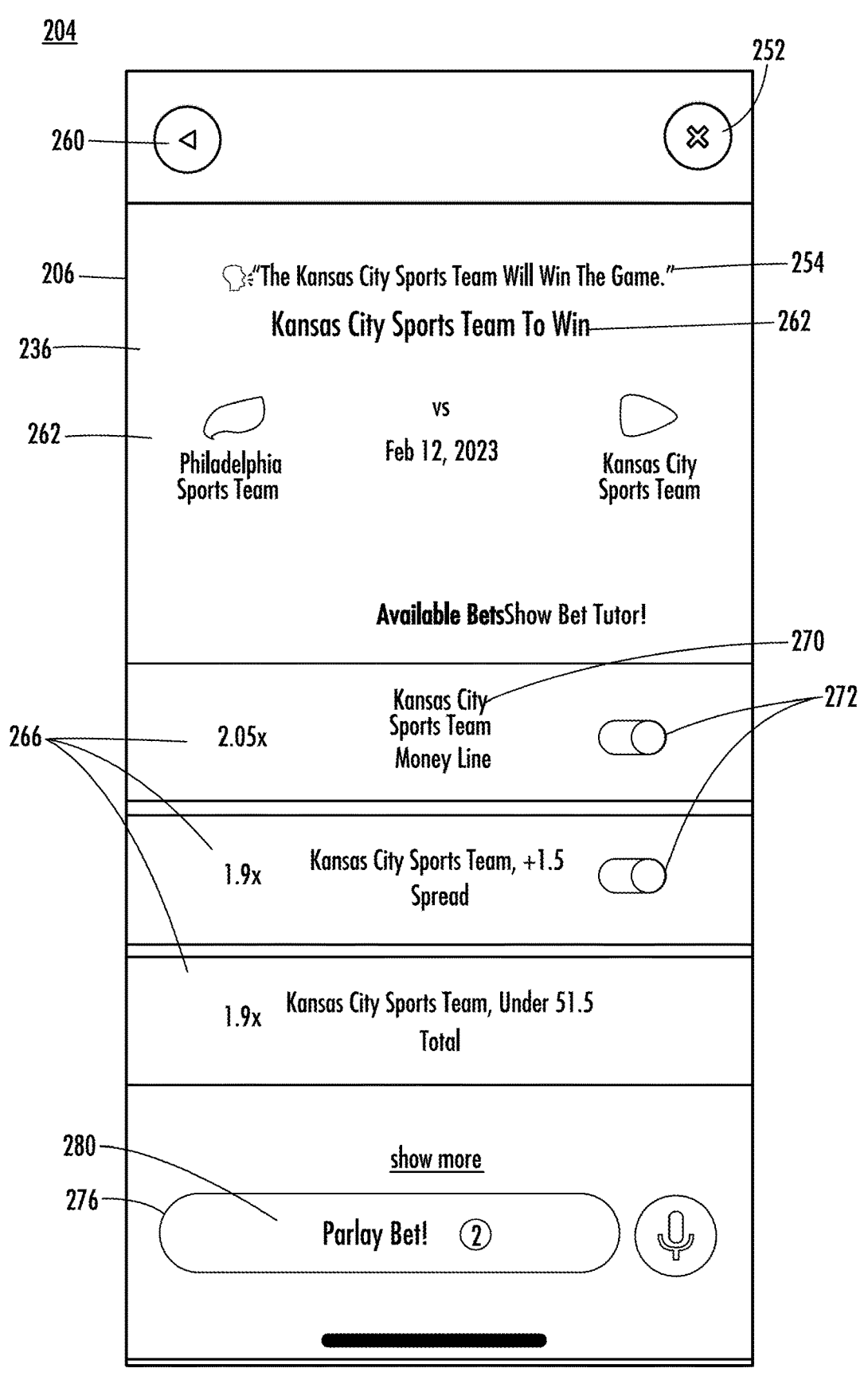

As shown by FIG. 2E, selection of more than one sports bet 266 may cause the bet placement button 276 to display a "parlay bet" indicator 280 to indicate that the selected sports bets 266 are linked. Alternatively, or in addition, the bet placement button 276 may be configurable to instead place multiple independent bets based on the selection of multiple sports bets 266 in the GUI 236.

Thus, instead of going through a long items selection process, via a rigid predetermined navigation tree, this and other embodiments allow the user the option to initiate the process of placing a bet by using voice input with spontaneous predictions on the outcome of a specific sport event (e.g. "I want to bet $10 that in the 4th Quarter the New York team will play very well"). By interpreting and correlating the voice input with the available betting markets offered by the and providing a relevant subset of congruent and relevant betting options (with associated odds), the time to locate and place a bet is drastically reduced while making the presentation and the selection of congruent betting markets easier for the user. By using an NLU platform employing artificial intelligence to interpret the audio communication and determine a relevant sporting event prediction, the identification and selection of the user's bets is reliably automated and may also offer relevant options on similar bets. In addition, over time, aspects of the system may learn and understand the user's personal choices and predict future sport betting behaviors, thereby enabling proactive offerings based on prior activity. In this manner, game velocity, personalization, and customer engagement may be increased.

Figure 3:
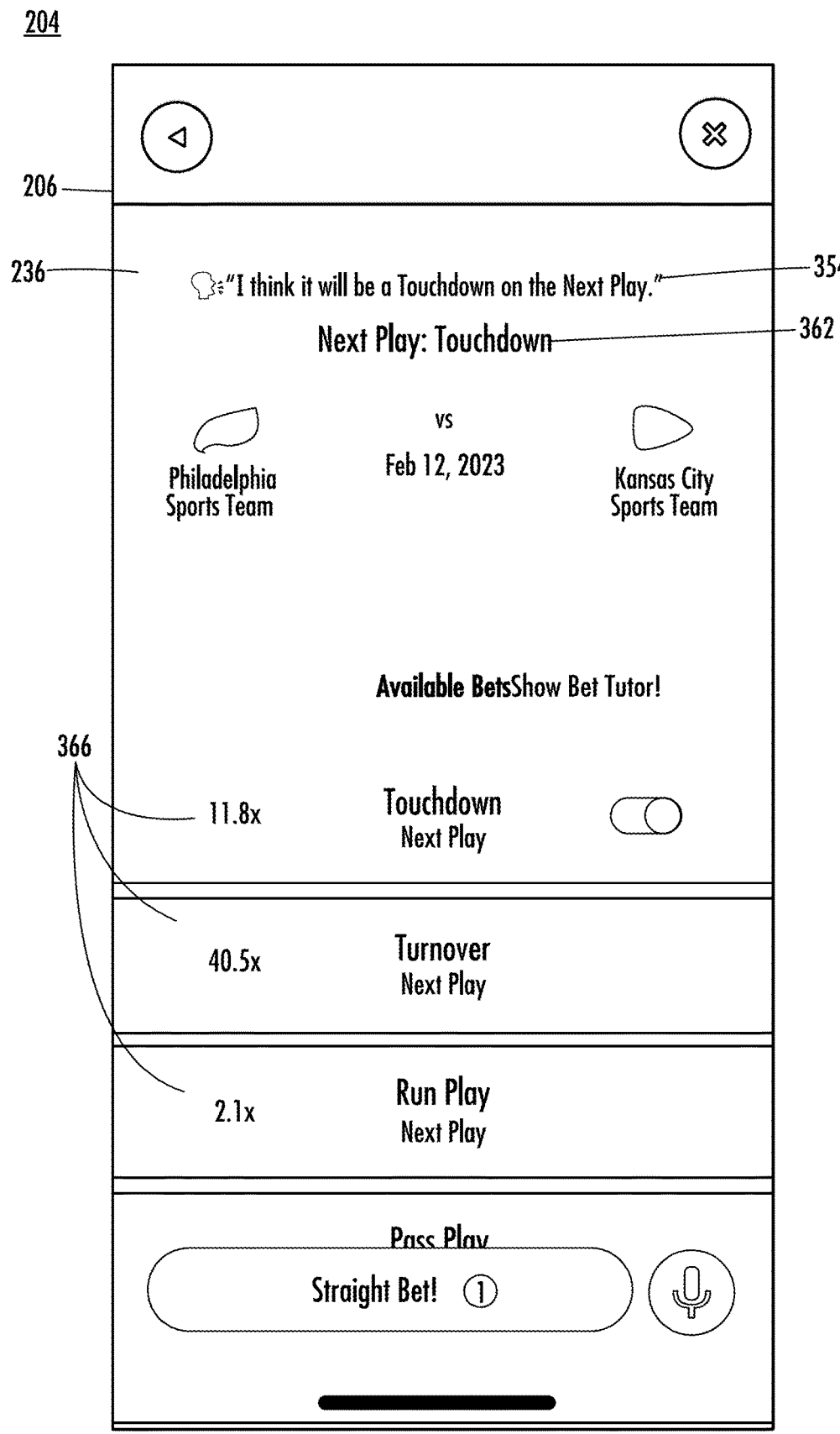
FIG. 3 illustrates an additional example of a sporting event prediction and correlated sports bets, according to some embodiments.
Figure 4:
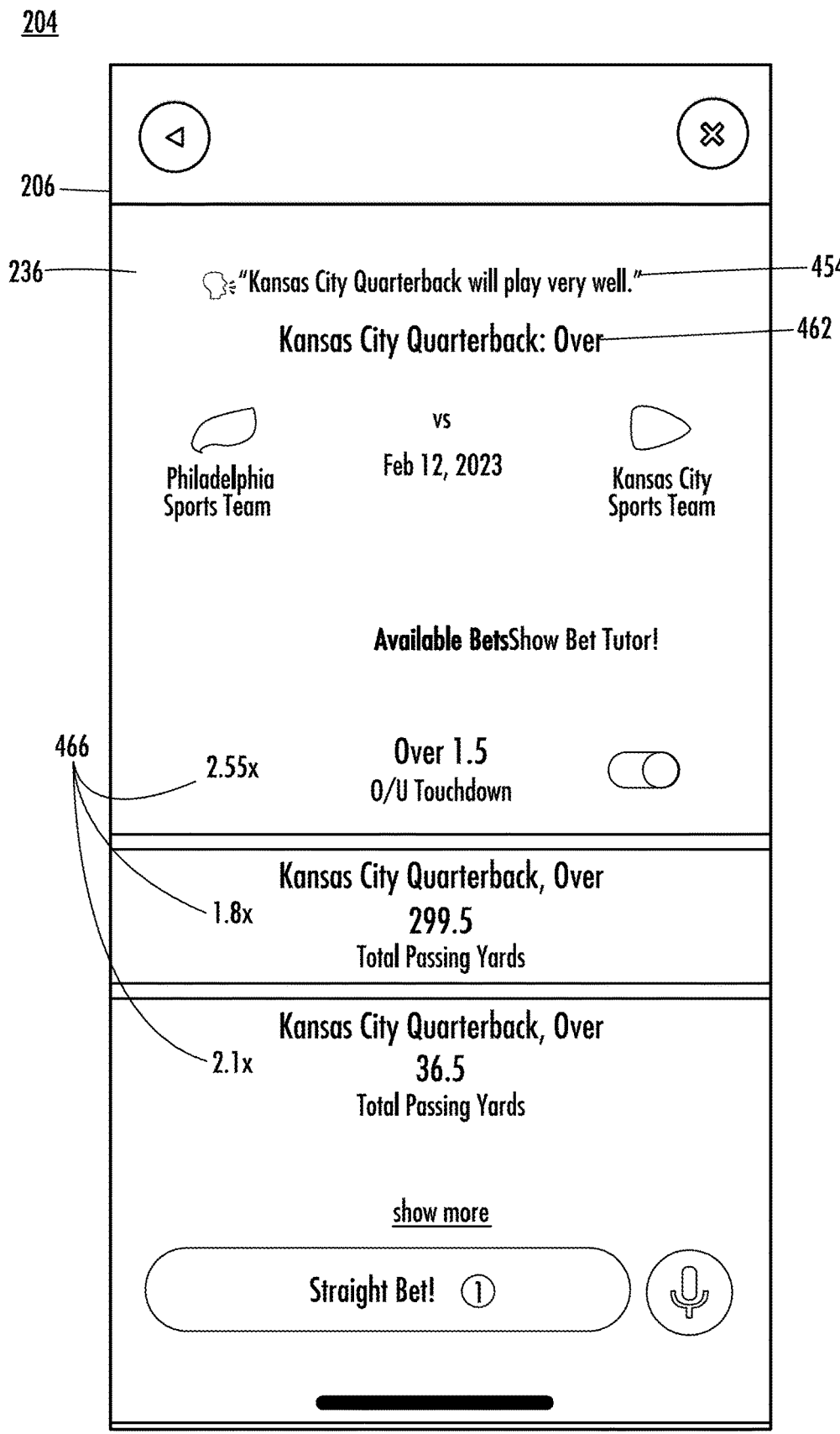
FIG. 4 illustrates an additional example of a sporting event prediction and correlated sports bets, according to some embodiments.
Figure 5:
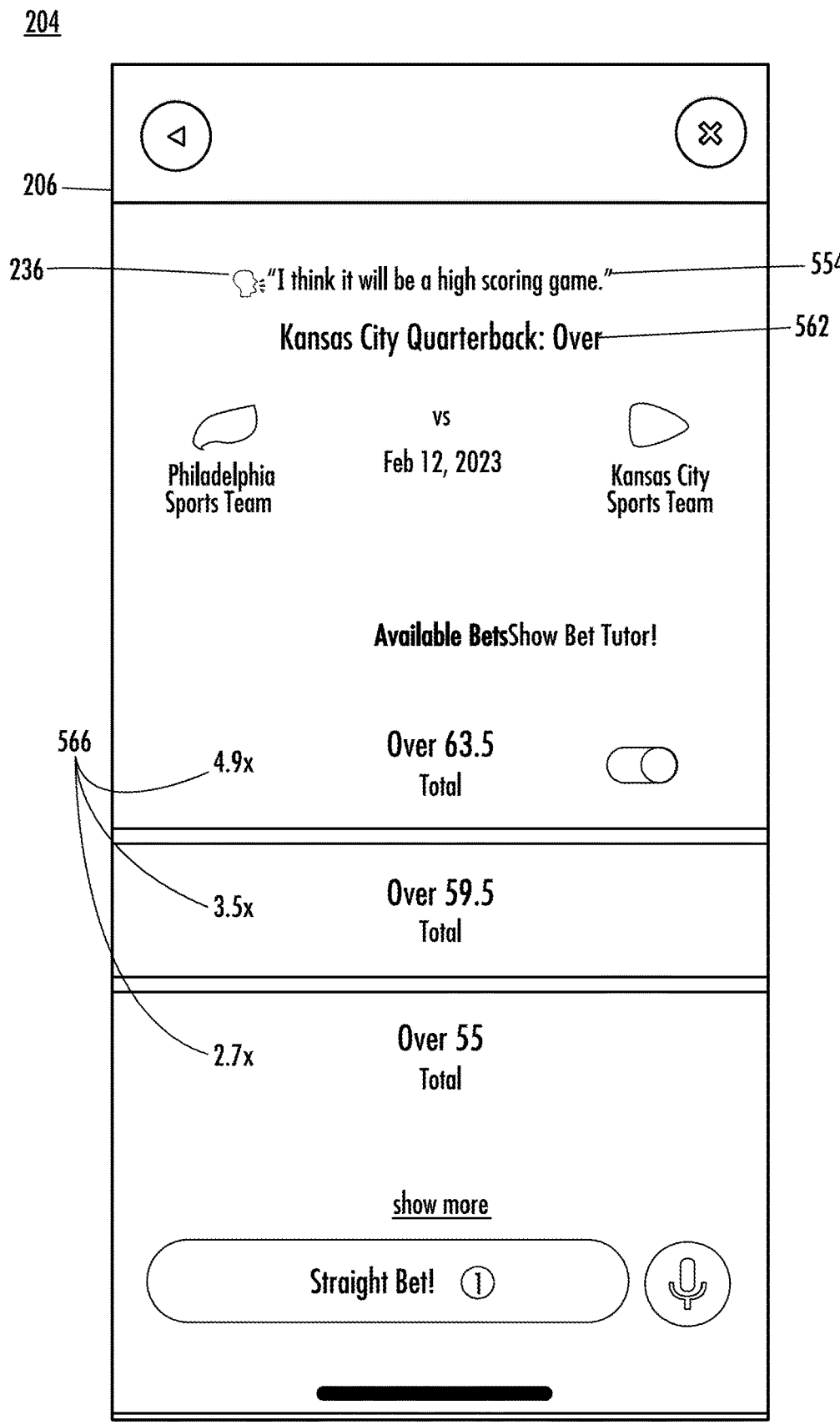
FIG. 5 illustrates an additional example of a sporting event prediction and correlated sports bets, according to some embodiments.

FIGS. 3-5 illustrate additional examples of sporting event predictions and correlated sports bets. For example, FIG. 3 illustrates a prediction 362 based on a communication 354 regarding an upcoming play ("I think it will be a touchdown on the next play"), and a plurality of sports bets 366 corresponding to the prediction 362 and other related bets associated with aspects of the prediction 362. FIG. 4 illustrates a prediction 462 based on a communication 454 regarding a particular player ("I think the Kansas City Quarterback will play very well", or "I think [player name] will play very well"), and a plurality of sports bets 466 corresponding to the prediction 462 and other related bets associated with aspects of the prediction 462. FIG. 5 illustrates a prediction 562 based on a communication 554 regarding the game itself ("I think it will be a high scoring game"), and a plurality of sports bets 566 corresponding to the prediction 562 and other related bets associated with aspects of the prediction 562.

Figure 6:
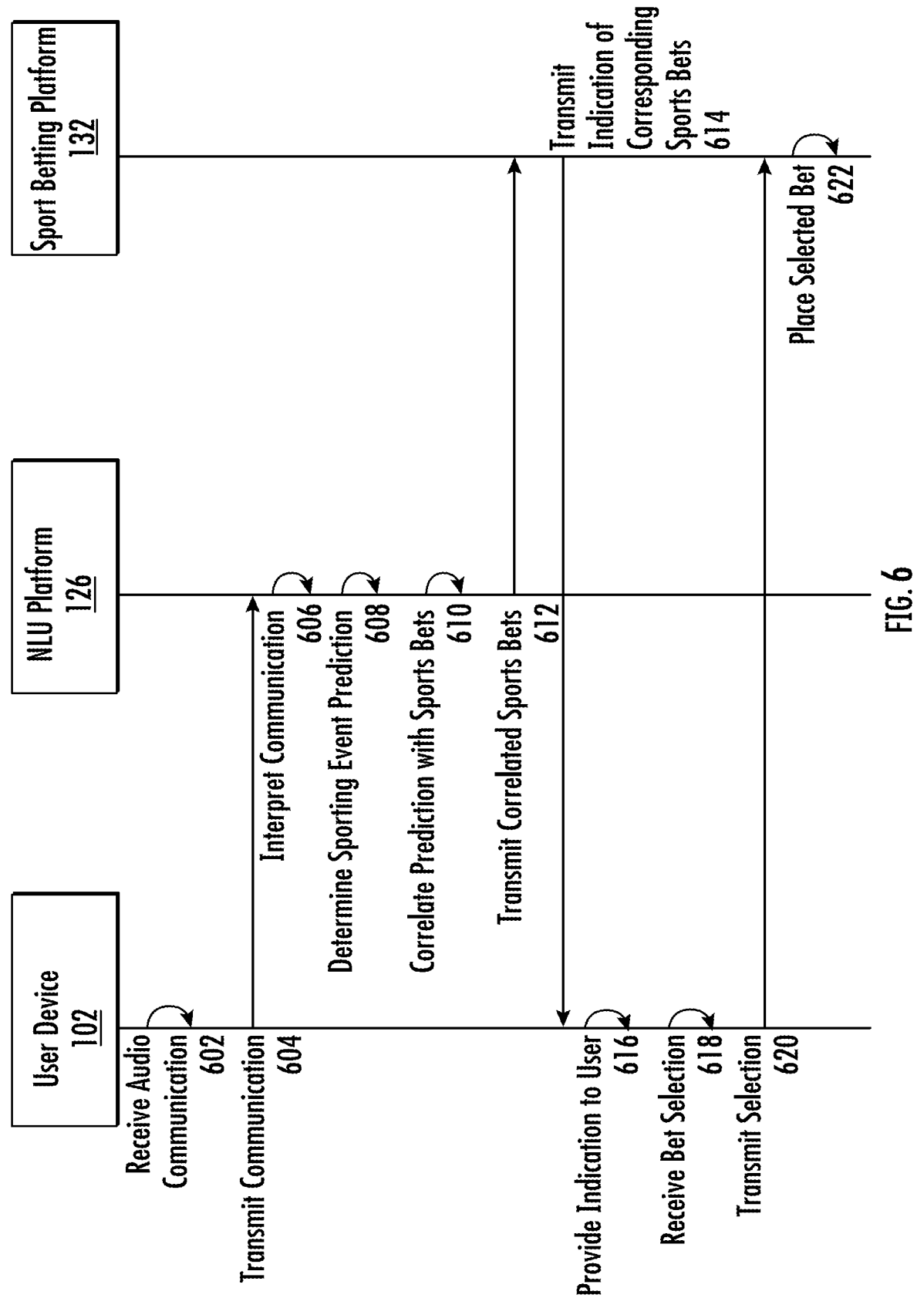
FIG. 6 is a communication diagram of operations of systems/methods for facilitating embodiments described herein, according to some embodiments.

Referring now to FIG. 6, a communication diagram of operations 600 of systems/methods for facilitating embodiments described herein. The operations 600 may be performed by one or more processor circuits of one or more computing devices, such as any of the computing devices described herein, for example.

The operations 600 may include receiving, by a user device 102, an audio communication from a user of the user device (Operation 602). For example, the audio communication may be received by a microphone associated with the user device, such as an integrated microphone or a microphone of a remote-control device in communication with the user device. It should also be understood that other input methods may be used, such as typing and/or selection of frequently used and/or favorite phrases or predictions. For example, a user may have the option to save specific preferred categories, criteria, teams, betting types, odds, bet amounts, etc., to a personalized user profile.

The operations 600 may further include transmitting the audio communication to an NLU platform 126 (Operation 604), interpreting the audio communication (Operation 606), and determining a sporting event prediction based on the interpretation (Operation 608). It should be understood, however, that different operations may be used by different components to interpret the audio communication and determine the sporting event prediction, as desired.

The operations 600 may further include correlating the sporting event prediction with a plurality of sports bets (Operation 610) and transmitting the correlated sports bets to a sports betting platform 132 (Operation 612). It should be understood, however, that different operations may be used by different components to correlate the correlating the sporting event prediction with sports bets, as desired.

The operations 600 may further include transmitting, by the sports betting platform 132, an indication of the corresponding sports bets to the user device 102 (Operation 614) and providing (e.g., displaying) an indication of the plurality of sports bets to the user (Operation 616).

The operations 600 may further include receiving by the user device (e.g., via an input device), a selection of at least one sports bet of the plurality of sports bets (Operation 618). The selection may be transmitted to the sports betting platform 132 (Operation 620) and the sports betting platform 132 may place the bet (Operation 622).

Figure 7:
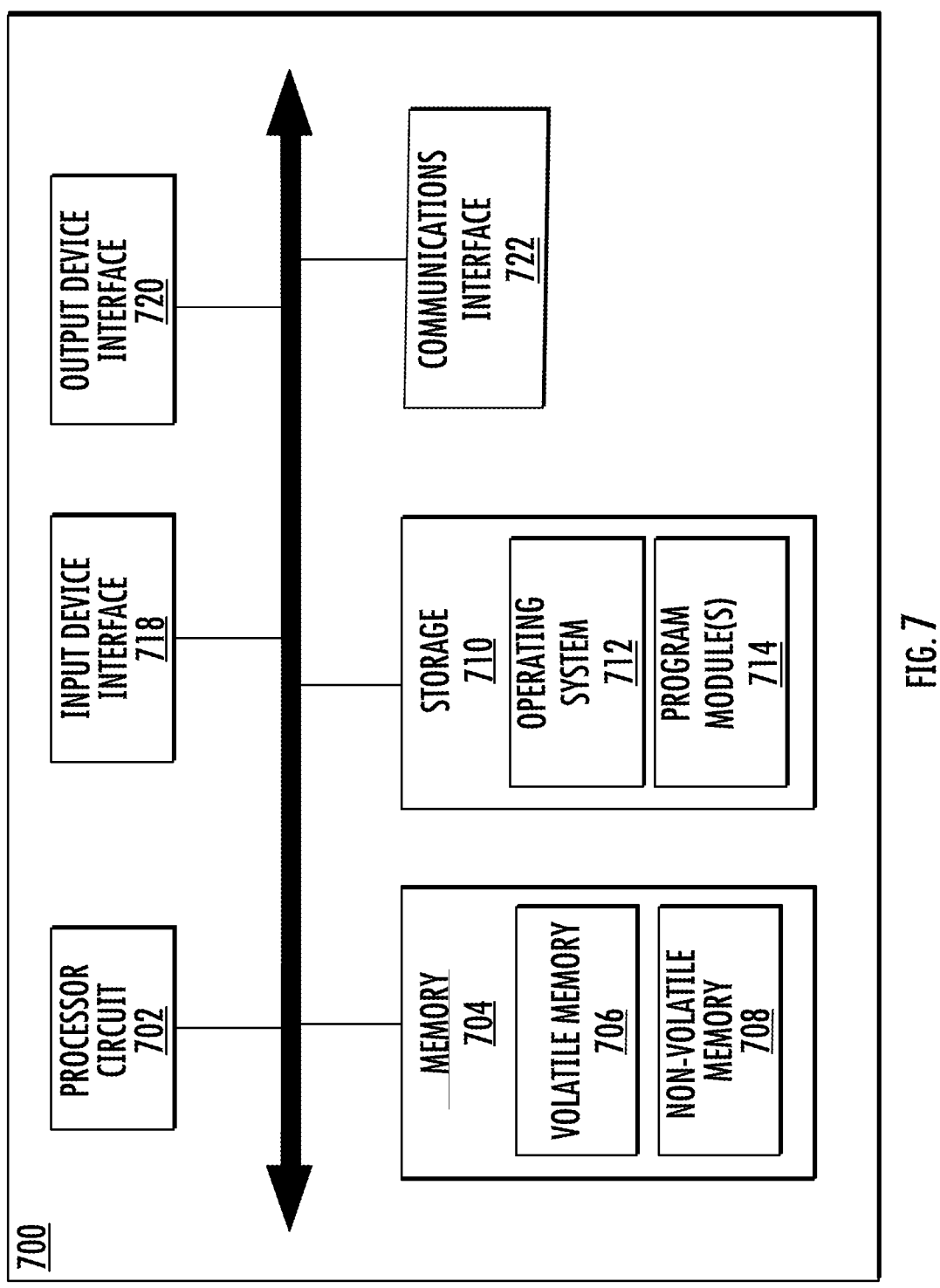
FIG. 7 is a schematic diagram of a computer system for implementing embodiments disclosed herein, according to some embodiments.

FIG. 7 is a schematic diagram of a computer system 700 for implementing embodiments disclosed herein. The computer system 700 is adapted to execute instructions from a computer-readable medium to perform these and/or any of the operations or processing described herein. The computer system 700 may be connected to other devices in a network, such as network 101 of FIG. 1. While only a single device is illustrated, the computer system 700 may include any collection of devices that individually or jointly execute instructions to perform any one or more of the operations discussed herein.

The computer system 700 may include a processor circuit 702, a memory 704, and a system bus 706 providing an interface for system components. The processor circuit 702 may, for example, include a general-purpose processor, an application specific processor, an Application Specific Integrated Circuit (ASIC), a group of distributed computers and/or processing components, or any combination thereof. The processor circuit 702 may further include computer executable code that controls operation of the computing device.

The memory 704 may be one or more devices for storing data and/or computer code for completing or facilitating operations described herein. The memory 704 may be connected to the processor circuit 702 via a system bus 705 and may include computer code for executing one or more processes described herein. The memory 704 may include non-volatile memory 706 (e.g., read-only memory (ROM), erasable programmable read-only memory (EPROM), etc.), and volatile memory 708 (e.g., random-access memory (RAM)), or any other medium which can be used to store desired program code in the form of machine-executable instructions or data structures and which can be accessed by a computer or other machine with a processor circuit 702.

The computer system 700 may further include or be coupled to a non-transitory computer-readable storage medium such as the storage device 710, which may comprise, for example, an internal or external hard disk drive (HDD) for non-volatile storage of data, data structures, computer-executable instructions, etc.

Computer code may be provided in the form of one or more modules. The module(s) can be implemented as software and/or hard coded in circuitry to implement the operations described herein in whole or in part. The modules may be stored in the storage device 710 and/or in the volatile memory 710, which may include an operating system 712 and/or one or more program modules 714, including the NLU module 128 and/or AI module 130 described above with respect to FIG. 1. All or a portion of the examples disclosed herein may be implemented as a computer program stored on the storage device 710 or any other transitory or non-transitory computer-readable storage containing machine-readable instructions that, when executed by the processor circuit 702, cause the processor circuit 702 to perform operations described herein.

The computer system 700 may include an input device interface 718 configured to receive input and selections to be communicated to the computer system 700 when executing instructions, such as from a keyboard, mouse, touch-sensitive surface, etc. Such input devices may be connected to the processor circuit 702 through the input device interface 718 coupled to the system bus 705 but can be connected through other wired and/or wireless interfaces, as desired. The computer system 700 may include an output device interface 720 configured to forward output, such as to a display. The computer system 700 may include a communications interface 722 suitable for communicating with a network and/or other devices as desired.

The terminology used herein is for the purpose of describing particular examples and embodiments and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the examples and embodiments described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A method comprising:

receiving, by a microphone of a user device, an audio communication comprising a spontaneous sporting event prediction from a user of the user device;

interpreting, by a processor circuit, the audio communication;

based on the interpretation, determining, by the processor circuit, the sporting event prediction;

correlating, by the processor circuit, the sporting event prediction with a plurality of sports bets;

in response to the correlation, controlling a Graphical User Interface (GUI) of the user device to display an indication of the plurality of sports bets to the user;

controlling the GUI, by an input device of the user device, to select at least one sports bet of the plurality of sports bets; and based on the selection, transmitting an instruction to a sports betting platform to cause the sports betting platform to place the at least one sports bet.

2. The method of claim 1, wherein interpreting the audio communication comprises processing the audio communication by a Natural Language Understanding (NLU) module.

3. The method of claim 1, wherein determining the sporting event prediction comprises processing the interpreted audio communication using an Artificial Intelligence (AI) module, wherein the AI module is trained to understand spontaneous predictions and convert the determined predictions into relevant sports betting options.

4. The method of claim 3, wherein the AI module is trained using training data comprising sample utterances, the sample utterances comprising examples of common phrases used in sports discussions, each sample utterance corresponding to one or more sports bets.

5. The method of claim 4, wherein correlating the sporting event prediction with the plurality of sports bets comprises generating an N-Best list data structure comprising recognized text of the spontaneous sports betting prediction, one or more sports bets corresponding to the recognized text of the spontaneous sports betting prediction, and a confidence score for each sports bet of the one or more sports bets based on a correlation between the recognized text of the spontaneous sports betting prediction and the sample utterances corresponding to the sports bet.

6. The method of claim 5, wherein displaying the indication of the plurality of sports bets by the GUI comprises, for each sports bet of the one or more sports bets:

determining whether the confidence score meets a predetermined threshold value, wherein display of the indication of the sports bet is based on a determination that the confidence score meets the predetermined threshold.

7. The method of claim 1, wherein correlating the sporting event prediction further comprises:

transmitting the correlated plurality of sports bets to a sports bet provider; and receiving, from the sports bet provider, an indication of associated sports bets offered by the provider.

8. The method of claim 1, wherein providing the indication of the plurality of sports bets comprises:

displaying, by a display device of the user device, a text indication of the plurality of sports bets.

9. The method of claim 1, wherein providing the indication of the plurality of sports bets comprises:

outputting, by a speaker device of the user device, an audio indication of the plurality of sports bets.

10. The method of claim 1, wherein receiving the selection comprises receiving a touch input by a touchscreen display device of the user device.

11. The method of claim 1, wherein receiving the selection comprises:

receiving a second audio communication from the user; and determining the selection based on the second audio communication.

12. The method of claim 1, wherein placing the sports bet comprises transmitting an indication of the selected sports bet to a sport bet provider.

13. A system comprising:

a processor circuit; and a memory coupled to the processor circuit, the memory comprising machine-readable instructions that, when executed by the processor circuit, cause the processor circuit to:

receive, from a microphone of a user device, an audio communication comprising a spontaneous sporting event prediction from a user of the user device;

interpret the audio communication;

based on the interpretation, determine a sporting event prediction;

correlate the sporting event prediction with a plurality of sports bets; and in response to the correlation, controlling a Graphical User Interface (GUI) of the user device to display an indication of the plurality of sports bets to the user.

14. The system of claim 13, wherein determining the sporting event prediction comprises processing the interpreted audio communication using an Artificial Intelligence (AI) module of the user device, wherein the AI module is trained to understand spontaneous predictions and convert the determined predictions into relevant sports betting options.

15. The system of claim 13, wherein determining the sporting event prediction comprises:

transmitting the indication of the interpreted audio communication to an Artificial Intelligence (AI) module in communication with the processor circuit, wherein the AI module is trained to understand spontaneous predictions and convert the determined predictions into relevant sports betting options.

16. The system of claim 13, wherein correlating the sporting event prediction comprises:

transmitting the correlated plurality of sports bets to a sports bet provider; and receiving, from the sports bet provider, an indication of associated sports bets offered by the provider.

17. A computing device comprising:

a first processor circuit; and a memory coupled to the processor circuit, the memory comprising a Natural Language Understanding (NLU) module, an Artificial Intelligence (AI) module, and a machine-readable instructions that, when executed by the processor circuit, cause the processor circuit to:

receive, from a microphone associated with the computing device, an audio communication comprising a spontaneous sporting event prediction from a user of the computing device;

interpret the audio communication using the NLU module;

based on the interpretation, determine the sporting event prediction using the AI module, wherein the AI module is trained to understand spontaneous predictions and convert the determined predictions into relevant sports betting options;

correlate the sporting event prediction with a plurality of sports bets;

transmit, via a network an indication of the plurality of sports bets to a sports betting platform comprising a second processor circuit;

receive, from the sports betting platform, an indication of a plurality of associated sports bets offered by the sports betting platform;

in response to the correlation, control a Graphical User Interface (GUI) of a display device to cause the display device to display an indication of the plurality of sports bets to the user;

receive, by an input device associated with the computing device, a selection of at least one sports bet of the plurality of sports bets; and based on the selection, transmit, via the network an instruction to the second processor circuit of the sports betting platform to place at least one sports bet corresponding to an associated sports bet offered by the sports betting platform.

18. The computing device of claim 17, wherein the computing device comprises a mobile computing device comprising the microphone and a touchscreen display device, the touchscreen display device comprising the display device and the input device.

19. The computing device of claim 17, wherein the computing device comprises a set-top digital media player in communication with:

a remote-control device comprising the microphone and the input device; and a television device comprising the display device.

20. The computing device of claim 17, wherein the computing device comprises:

a smart television device comprising the display device; and a remote-control device in communication with the smart television device, the remote-control device comprising the microphone and the input device.

\* \* \* \* \*